Patented Jan. 29, 1952

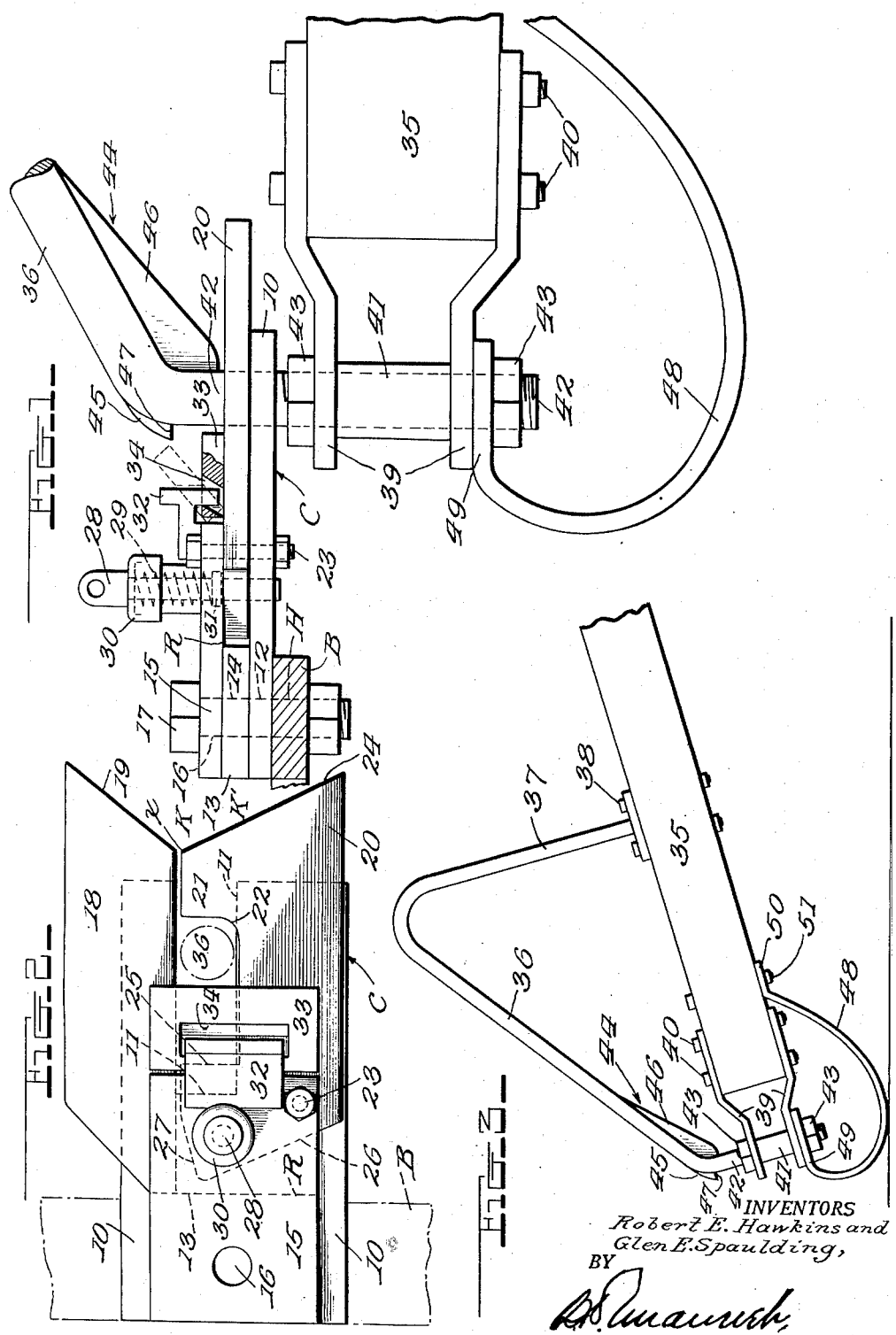

2,583,840

UNITED STATES PATENT OFFICE 2,583,840

DRAFT COUPLING

Robert E. Hawkins and Glen E. Spaulding, Tipton, Ind.; said Hawkins assignor to said Spaulding Application February 15, 1950, Serial No. 144,256

8 Claims. (Cl. 280—33.15)

This invention relates to coupling or hitch devices for detachably connecting a tractor to farm equipment to be drawn thereby, such as a wagon, trailer, soil or plant working implement or machine or the like having a conventional tongue equipped to cooperate with the coupling carried by the tractor.

An object of the invention is to provide a simple, novel and efficient and positively operating coupling or hitch for connecting a tractor to a farm wagon, trailer or implement by backing the tractor into the latter at its specially equipped draft tongue and for easily unfastening, unhitching or uncoupling and disconnecting the tractor from the vehicle or farm implement when desired.

Another object is to automatically lock the coupling in the connected or hitched position of the tractor and a farm implement, machine or vehicle, such as a wagon, trailer or the like, to prevent accidental separation or unhitching thereof especially when turning or from uneven surfaces, roads or terrain or hilly country.

A still further object is to provide a novel coupling of the character stated which will cause the tongue to rise to normal horizontal operative position with the coupling of the tractor to a vehicle or implement tongue, and which includes a fork to guide a sloping coupling bar on the tongue into a cooperating receiving and retaining coupling hook of the coupling member on the tractor draft bar or hitch and to elevate the bar and tongue of the vehicle or implement to which the bar is applied, attached and mounted, and to cause the bar and a harpoon head or dovetailed wedge at the front thereof to engage behind and close a hook from a V-shaped fork or entering and guiding end including a portion of the hook, which latter is automatically closed and held by a spring loaded pin to drop from a lifted raised position and hold the pivoted hook against releasing movement in a locked coupled or closed position behind the hook, while at the same time raising a flap which engages in front of the wedge upon moving the tractor forward and drops beneath the wedge to lock the bar and tongue in a raised substantially horizontal normal position for use in moving the vehicle or implement forward pulled by the tractor, it being simply necessary to lift the pin from engaged position to release or pull out the bar and tongue upon advancing or pulling on the tractor or the tongue and bar when the tongue may fall or drop on a skid connected with the bar to and beneath the tongue to support and keep the tongue from sticking in the ground when falling and again in position to be coupled to the tractor as explained.

Another object is to provide a coupling device or hitch which can be economically produced and applied to the tractor and tongue, and which is simple of construction, efficient and positive in operation and safe, since it may be automatically engaged and locked and will not pull loose.

With the above and other objects in view, as will be presently apparent, the invention consists in general of certain novel details of construction and combinations of parts hereinafter fully described, illustrated in the accompanying drawings and particularly claimed.

In the drawings, like characters of reference indicate like parts in the several views, and Figure 1 is a side elevation partly in section showing the coupling in closed position for connecting a tractor hitch and a vehicle or implement tongue in a raised horizontal draft position;

Figure 2 is a top plan view of the coupling part which is attached to and carried by the tractor in horizontal, rearwardly extending, operative position for use in coupling to a tongue; and Figure 3 is a side elevation of the tongue with its coupling bar and supporting skid dropped to the ground when disconnected or uncoupled from the tractor part.

Referring to the drawings in detail, the coupling or hitch device includes and comprises a part or member attachable to the draft bar or hitch of a tractor, represented as a transverse draw bar B supported horizontally at the rear of a tractor frame or chassis adjacent the drive wheels thereof and provided with a central vertical hole H to which the coupling part C is attached. The coupling part C comprises a flat oblong bottom plate 10 having a rectangular notch 11 formed in its trailing end extending for approximately one-half the length of the plate, the longitudinal axis of said notch being to one side of the longitudinal axis of the plate. The leading end of said bar 11 is adapted to rest on the bar B and has a hole 12 aligned with and over hole H in said bar. An intermediate irregularly shaped plate 13 having a short rectangular front portion, which may be narrower than plate 10 and with a similar hole 14, rests on plate 10 and supports a top plate 15 of the same width as the front portion of plate 13, longer than the same and shorter than plate 10, thereon at its front end with its rear end projecting beyond plate 13 partly over and in spaced parallel relation to the top of plate 10 in overhanging position. Plate 15 has a similar hole 16 and a bolt 17 extends through the holes to securely connect the plates and pivotally attach the same and element C to bar B for lateral swinging movement in a horizontal plane. In effect, the plates form a slotted bar or plate member stepped or recessed at the back or rear end with the top part or wall terminating about midway of the length of plate 10, or at its longitudinal center, and the intermediate part or spacer 13 terminating short or about midway of the length of part 15, cut out or recessed horizontally and transversely at the rear as at R.

Plate 13 is provided with a forward and lateral guide extension 18 of the shape of an oblique parallelogram, formed at the rear edge and corner at one side and projecting outwardly and rearwardly thereof and partially overlying plate 10 to slot 11. The rear end or edge of extension 18, like the front edge, extends diagonally to slope inwardly as at 19. A plate 20 of the general shape of an oblique parallelogram and having a rectangular notch 22 in its inner edge which forms a hook 21 is pivoted in recess R on a pin or bolt 23 through plate 10 and rear corner of plate 15 at the side opposite where extension 18 is formed. The longitudinal edge of notch 22 substantially lines up with but is slightly set back or outwardly of the adjacent edge of slot 11 while the hook 21 extends to a point adjacent the opposite edge of slot 11 and aligned inner edge of extension 18. The rear edge or end 24 of hook plate 20 converges or slopes in the opposite direction from edge 19 to form a V-shaped fork or entering mouth rearwardly of plate 10 beyond which parts 18 and 20 extend. The opposite or front end of hook plate 20 overlies slot 11 at the front and extends transversely inwardly normal thereto and slot 11, and the rear and side edges 26 and 27 of hook plate 20 converge forwardly toward each other at an acute angle to a point to permit this end to clear the adjacent edges of recess R at the rear end of plate 13 and inner edge of lateral extension 18.

A spring loaded or biased pin 28 with a biasing spring 29 in a casing 30 with a removable cap and carried by plate 15 engages aligned apertures in plates 10, 15 and 20 to lock the hook plate 20 in closed position as seen in Figure 2, when such is desired. Pin 28 has a stop collar or flange 31 to prevent its complete withdrawal from the casing, and when pin 28 is pulled out of the holes in plates 10 and 20, the hook plate 20 is free to pivot on pin 23. A T-shaped hook or plate 32 fixed to or formed on plate 15 or casing 30 with the leg or plate horizontal above the rear end of plate 15 over hook plate 20, slot 11 and notch 22 and its head vertical, has a flap or guiding and locking plate 33 in the form of a loop with an opening 34, the axis of which is inclined rearwardly as shown, and receiving the head so that the flap is free to pivot vertically around hook 32, coming to a stop when the inclined wall of the locking plate opening hits the head 32 as shown in the dotted line position of Fig. 1.

The vehicle or implement tongue is designated at 35 and an angular forwardly sloping or inclined coupling bar 36 is mounted on tongue 35 by means of a long vertical rear leg 37 at base plate 38 bolted in position. A clevis or yoke comprising top and bottom angular plates or bars 39 is bolted vertically through the tongue 35 as at 40 with a bearing collar or sleeve 41 held between said bars in any suitable way, as by riveting, welding or the like. Bar 36 inclines forwardly at a sharp angle of about 45° or otherwise, and whereas leg 37 depends at an acute angle from the upper bent end thereof, the short vertical front leg 42 depends at an obtuse angle to extend through collar or sleeve 41 and is held by nuts 43 threaded on the leg 42 against the top and bottom plates 39 of the clevis or yoke to fix the bar 36 in position. The bar 36 adjacent the bend at leg 42 is formed with a downwardly enlarged wedge shaped head 44 formed by tapered top and bottom lugs or flanges indicated at 45 and 46, the lug 45 producing a downwardly facing stop shoulder 47 to hold flap 33 down and support the bar 36 and tongue 35 in conjunction with the flange 46 which rests on hook plate 20. A skid 48 preferably curvilinear and convex at the bottom is fastened to the tongue 35 and bar 36 at the bottom, such as by having the upwardly curved front end of the skid bar or runner extended or bent rearwardly and inwardly as at 49 and apertured to receive the lower end of leg 42 between lower plate 39 and nut 43 to clamp the same, while the rear end 50 of skid 48 extends horizontally and is bolted to and through the tongue as at 51. The skid supports the tongue in a slightly elevated position from the ground.

In operation and use of the coupling device, the coupling part or element C is attached to a tractor at bar B by bolt 17 to turn, but preferably is held rigid by tightening the nut on the bolt. The coupling bar 36 and skid 48 are attached to the tongue 35 of a wagon, trailer, implement or machine. With the tractor and tongue properly related, the tractor is backed to the tongue, allowing or causing the bar 36 at its inclined position to enter the V-shaped fork at 19 and 24 with pin 28 lifted and hook plate 20 free to swing out a distance in an arc substantially equal to the width of slot 11 and recess 22. Thus the point X of the hook 21 is allowed to assume any position between points K and K'. The hook 21 will open outwardly away from extension 18, allowing bar 36 to enter further guided by converging edge guides 19 and 24, into slot 11 where, due to the sloping design or incline of the bar 36 in engagement with flap or latch 33, it will raise the latter, allowing the bar to enter still further in front of hook 21 at recess 22 in slot 11 to contact the rear end 25 of recess 22 in hook plate 20. This will cause the hook plate 20 to close again placing the hook 21 adjacent the inside of extension 18 and contiguous wall of slot 11 as seen in Figure 2. This will line up the holes for the pin 28 in plates 10, 15 and 20, allowing the pin to drop into the same and lock the hook plate 21 in the closed position with bar 36 in front of hook 21. Then, upon moving the tractor forward, the dead weight of the implement bearing the tongue will hold it in place and bar 36 will slide up through the hook plate 20 causing the tongue 35 to raise, and as this pull is continued the bar 36 continues to slide and rise at wedge 44 and the adjacent bend in bar 36, until flanges 45 and 46 are above the hook 20 and flap or latch plate 32. The latter will then drop by gravity beneath stop shoulder 47 on bottom of flange 45, with the wide end of flange 46 of wedge 44 above hook plate 20 to support and lock the tongue 35 in a raised or elevated position ready for use. The bar 36 and tongue 35 may pivot or swing on member C in turning. To uncouple, the pin 28 is lifted locally as by grasping and raising same against the spring or from a remote point such as the tractor driver's seat with a connection to a hole in the top of the pin 28, allowing the hook plate 21 to swing out and open to release the bar 35 from bill 21 at recess 22 and pass out of same and slot 11. The tongue will fall on the skid 46 to keep the tongue from sticking in the ground when falling and in readiness to be again coupled to the tractor as described.

It will be noted that the elongated slot 22 in the hook plate 20 permits the sloping bar 36 to slide within the closed jaws and thus draw up the tongue as the tractor moves forward. Without this elongated slot the bar would bind and such raising would be impossible. However, to shorten this slot when the vertical leg 42 of the tongue assembly is in place and prevent undesirable play and permit the stop shoulders to function the loop 33 is provided which automatically falls into place when the coupling operation is completed.

While there is herein shown and described the preferred embodiment of the invention, it is nevertheless to be understood that minor changes may be made therein without departing from the spirit and scope of the invention as claimed.

What is claimed as new is:

1. In a coupling for a tractor attached drawbar and vehicle attached tongue, a bifurcated keeper on the drawbar having its legs directed rearwardly of said bar to form an elongated, open-ended slot, flared guide means leading to the open end of said slot, a latch member attached to said keeper movable to open or close the end of said slot, an upstanding hitch frame on said tongue of such height that an upper portion thereof will enter said slot guide means when said tractor drawbar is backed against said hitch frame and while said tongue end is resting upon the ground, said frame having an upwardly and rearwardly inclined portion slidable in said elongated slot whereby when it is held therein by said latch member and said tractor is moved forwardly said tongue will be cammed upwardly into operating position.

2. A coupling as set forth in claim 1 having means on said upstanding frame for automatically locking said tongue and frame in elevated position.

3. A coupling as set forth in claim 1 further having means for automatically shortening said elongated slot when said hitch frame is coupled therein and has reached operating position.

4. In an automatic coupling for a tractor attached drawbar and vehicle attached tongue, a bifurcated keeper on the drawbar having its legs directed rearwardly of said bar to form an elongated open-ended slot, flared guide means leading to the open end of said slot, a latch member attached to said keeper movable to open or close the end of said slot, an upstanding hitch frame on said tongue, said frame including a relatively short vertical leg adjacent the outer end of said tongue and an inclined portion extending upwardly and rearwardly from the top of said leg, said inclined portion engaging the keeper when the coupling parts are moved together and when said tongue rests upon the ground and then sliding in said elongated keeper slot as the tractor is moved forwardly to cam said tongue upwardly and guide said short vertical leg into said keeper.

5. A coupling as set forth in claim 4 wherein said vertical leg carries at least one outwardly and downwardly flaring lug defining a downwardly facing shoulder wherein when said inclined portion has been drawn through the slot to raise the tongue and seat said short vertical leg in said keeper said shoulder will form a stop means to prevent the tongue from dropping if tension on the coupling should be released.

6. In a coupling for a tractor attached drawbar and vehicle attached tongue, a bifurcated keeper on the drawbar having its legs directed rearwardly of said bar to form an elongated, open-ended slot, a latch member attached to said keeper movable to open or close the end of said slot, a freely hinged flap member attached to the upper face of said keeper and normally overlying the forward end of said elongated slot, an upstanding hitch frame on said tongue, said frame including a relatively short vertical leg adjacent the outer end of said tongue and an inclined portion extending upwardly and rearwardly from the top of said leg, said freely hinged flap member being pivotally displaced upwardly when said inclined member is drawn through the elongated keeper slot but automatically falling downwardly by force of gravity to shorten said slot when said short vertical leg has been drawn into operating position.

7. A coupling as set forth in claim 6 wherein said short vertical leg has adjacent its upper end a plurality of downwardly flaring lugs which define stop shoulders which engage said flap and keeper when said leg has been moved into operating position to prevent dropping of the tongue when tension on the coupling is relaxed.

8. A coupling as set forth in claim 6 wherein the hitch frame further includes a curvilinear skid at the bottom of the tongue to raise and hold said tongue in better position for automatic engagement of the coupling parts.

ROBERT E. HAWKINS.
GLEN E. SPAULDING.

REFERENCES CITED

The following references are of record in the file of this patent:

UNITED STATES PATENTS

| Number | Name | Date |
| --- | --- | --- |
| 751,692 | Semm | Feb. 9, 1904 |
| 795,966 | George | Aug. 1, 1905 |
| 1,491,637 | Schrum | Apr. 22, 1924 |
| 2,464,424 | Weldon et al. | Mar. 15, 1949 |